(12) United States Patent
Bookbinder et al.

(10) Patent No.: US 8,012,894 B2
(45) Date of Patent: Sep. 6, 2011

(54) GLASSES HAVING LOW OH, OD LEVELS

(75) Inventors: Dana Craig Bookbinder, Corning, NY (US); Richard Michael Fiacco, Corning, NY (US); Kenneth Edward Hrdina, Horseheads, NY (US); Rostislav Radievich Khrapko, Corning, NY (US)

(73) Assignee: Corning Incorporated, Corning, NY (US)

( * ) Notice: Subject to any disclaimer, the term of this patent is extended or adjusted under 35 U.S.C. 154(b) by 450 days.

(21) Appl. No.: 12/151,172

(22) Filed: May 5, 2008

(65) Prior Publication Data

US 2008/0287279 A1    Nov. 20, 2008

Related U.S. Application Data

(60) Provisional application No. 60/928,471, filed on May 9, 2007.

(51) Int. Cl.
*C03C 3/06* (2006.01)
*C03B 19/06* (2006.01)
*C03B 19/00* (2006.01)
*C03B 37/00* (2006.01)
*C03B 37/018* (2006.01)

(52) U.S. Cl. .......... 501/54; 65/17.4; 65/17.6; 65/32.1; 65/413; 65/421; 65/422

(58) Field of Classification Search .......... 501/53, 501/54; 65/17.3, 17.4, 17.6, 32.1, 413, 421, 65/422
See application file for complete search history.

(56) References Cited

U.S. PATENT DOCUMENTS

| 4,504,297 | A | 3/1985 | Kosinski et al. |
| 4,515,612 | A * | 5/1985 | Burrus et al. .......... 65/426 |
| 5,713,979 | A | 2/1998 | Nicholson et al. |
| 6,220,059 | B1 | 4/2001 | Klein et al. |
| 2004/0060327 | A1 | 4/2004 | Berkey et al. |
| 2007/0105703 | A1* | 5/2007 | Bookbinder et al. .......... 501/54 |
| 2007/0105704 | A1* | 5/2007 | Bookbinder et al. .......... 501/54 |
| 2008/0053150 | A1* | 3/2008 | Moore et al. .......... 65/17.6 |

FOREIGN PATENT DOCUMENTS

| EP | 0483477 A1 | 8/1991 |
| JP | 59227741 | 12/1984 |
| JP | S60-153004 A * | 8/1985 |
| WO | 2007/053733 A1 | 5/2007 |

* cited by examiner

*Primary Examiner* — Jerry A Lorengo
*Assistant Examiner* — Noah S Wiese
(74) *Attorney, Agent, or Firm* — Robert P. Santandrea

(57) ABSTRACT

A fused silica glass and a fused silica article having a combined concentration of at least one of OH and OD of up to about 50 ppm. The fused silica glass is formed by drying a fused silica soot blank or preform in an inert atmosphere containing a drying agent, followed by removal of residual drying agent from the dried soot blank by heating the dried soot blank in an atmosphere comprising an inert gas and of oxygen.

19 Claims, 11 Drawing Sheets

GLASSES HAVING LOW OH, OD LEVELS

CROSS REFERENCE TO RELATED APPLICATIONS

This application claims the benefit of U.S. Provisional Application No. 60/928,471 filed on May 9, 2007.

BACKGROUND OF INVENTION

The invention relates to fused silica glass and articles made therefrom. More particularly, the invention relates to fused silica glass having low concentrations of hydroxyl (OH) groups, deuteroxyl (OD) groups, chlorine (Cl), bromine (Br), and fluorine (F). Even more particularly, the invention relates to fused silica glass having low concentrations of the above-mentioned species that lead to low levels of light induced wavefront distortion and polarization induced birefringence.

Optical components used in the semiconductor field, particularly in the area of lithography, have stringent requirements for both dynamic and static properties. Dynamic properties of interest include light induced wavefront distortion (LIWFD), induced absorption (IA), polarization induced birefringence (PIB), and fluence dependent transmission (FDT). Static properties of interest include, among others, refractive index homogeneity (index homogeneity), birefringence, and transmission.

It is difficult for currently available fused silica optical elements to meet index homogeneity requirements for semiconductor lithography applications. In addition, the next generation of lithography optics will require improved LIWFD, PIB, and index homogeneity. Therefore, what is needed is a fused silica glass having improved index homogeneity, light induced wavefront distortion, and polarization induced birefringence.

SUMMARY OF INVENTION

The present invention meets these and other needs by providing a fused silica glass and a fused silica article having a total or combined concentration of up to about 50 ppm of at least one of OH and OD. The fused silica article also has a refractive index variation (also referred to herein as index homogeneity) at a wavelength of 633 nm of less than about 5 ppm in a direction in which the OH and OD concentrations have a combined variation of less than about 25 ppm; and over a distance of at least about 50 mm along a dimension of the sample perpendicular to incident light. In one embodiment, the fused silica glass may be formed by drying a fused silica soot blank or preform in an inert atmosphere containing at least one drying agent, followed by removal of residual drying agent from the dried soot blank by heating the dried soot blank in an atmosphere comprising an inert gas and of oxygen.

Accordingly, one aspect of the invention is to provide a fused silica article. The fused silica article comprises at least one of OH and OD, wherein OH and OD are present in a combined concentration of up to about 50 ppm. The ratio of OD concentration to the sum of OD concentration and OH concentration is greater than the natural isotopic abundance of deuterium. The fused silica article has a refractive index variation at a wavelength of 633 nm of less than about 5 ppm: i) in a direction in which the OH and OD concentrations have a combined variation of less than about 25 ppm; and ii) over a distance of at least about 50 mm along a dimension of the sample perpendicular to incident light.

A second aspect of the invention is to provide a fused silica glass. The fused silica glass is substantially free of OH and comprises up to about 50 ppm of OD. The fused silica glass has a refractive index variation at a wavelength of 633 nm of less than about 5 ppm: i) in a direction in which the OD concentration has a combined variation of less than about 25 ppm; and ii) over a distance of at least about 50 mm along a dimension of the sample perpendicular to incident light.

A third aspect of the invention is to provide a fused silica article. The fused silica article is substantially free of OH and comprises up to about 50 ppm of OD. The fused silica article has a refractive index variation at a wavelength of 633 nm of less than about 5 ppm: i) in a direction in which the OD concentration has a combined variation of less than about 25 ppm; and ii) over a distance of at least about 50 mm along a dimension of the sample perpendicular to incident light.

A fourth aspect of the invention is to provide a lithographic system. The lithographic system has an optical path and comprises at least one fused silica optical member disposed in the optical path. The at least one fused silica optical member comprises at least one of OH and OD, wherein OH and OD are present in a combined concentration of up to about 50 ppm, wherein the fused silica article has a refractive index variation at a wavelength of 633 nm of less than about 5 ppm: i) in a direction in which the OH and OD concentrations have a combined variation of less than about 25 ppm; and ii) over a distance of at least about 50 mm along a dimension of the sample perpendicular to incident light.

A fifth aspect of the invention is to provide a method of making a fused silica glass comprising at least one of OH and OD, wherein OH and OD are present in a combined concentration of up to about 50 ppm, and wherein the ratio of OD concentration to the sum of OD concentration and OH concentration is greater than the natural isotopic abundance of deuterium. The method comprises the steps of: providing a silica soot blank, the soot blank comprising at least one of OH and OD; drying the soot blank to form a dried soot blank in an atmosphere comprising an inert gas and a predetermined concentration of at least one drying agent at a predetermined temperature, wherein the halogen-containing species removes OH and OD from the soot blank; removing the at least one drying agent from the dried soot blank; and sintering the soot blank to form the fused silica glass comprising at least one of OH and OD, wherein OH and OD are present in a combined concentration of up to about 50 ppm.

A sixth aspect of the invention is to provide an article comprising fused silica glass. The fused silica glass comprises at least one of OH and OD, wherein OH and OD are present in a combined concentration of up to about 50 ppm, and the ratio of OD concentration to the sum of OD concentration and OH concentration is greater than the natural isotopic abundance of deuterium. The fused silica article has a refractive index variation at a wavelength of 633 nm of less than about 5 ppm: i) in a direction in which the OH and OD concentrations have a combined variation of less than about 25 ppm; and ii) over a distance of at least about 50 mm along a dimension of the sample perpendicular to incident light. The fused silica article is formed by: providing a silica soot blank comprising at least one of OH and OD; drying the soot blank to form a dried soot blank in an atmosphere comprising an inert gas and a predetermined concentration of at least one drying agent at a predetermined temperature, wherein the drying agent removes OH and OD from the soot blank; removing the at least one drying agent from the dried soot blank; and sintering the soot blank to form the fused silica glass.

These and other aspects, advantages, and salient features of the present invention will become apparent from the following detailed description, the accompanying drawings, and the appended claims.

DETAILED DESCRIPTION

Figure 1:
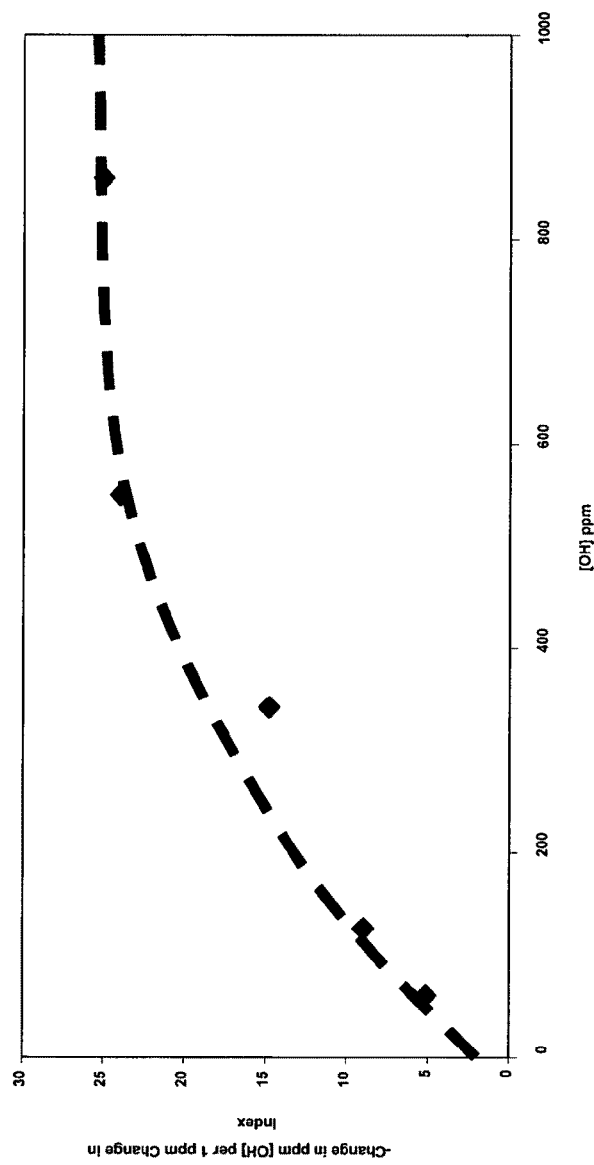
FIG. 1 is a plot of the change in OH concentration per 1 ppm change in refractive index as a function of average OH concentration.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as either comprising at least one of a group of elements and combinations thereof, it is understood that the group may comprise any number of those elements recited, either individually or in combination with each other. Similarly, whenever a group is described as consisting of at least one of a group of elements or combinations thereof, it is understood that the group may consist of any number of those elements recited, either individually or in combination with each other.

As used herein, the term "hydroxyl(s)" or OH means a moiety or a group of moieties each consisting of an oxygen atom and a protium atom ($_1{}^1$H, referred to herein as "H"). The oxygen atom may be any of the naturally occurring isotopes of oxygen ($^{16}$O, $^{17}$O, or $^{18}$O), or mixtures thereof at any proportion. As used herein, n(OH) means the total number of OH moieties in a material.

As used herein, the term "deuteroxyl(s)" or OD means a moiety or a group of moieties, each consisting of an oxygen atom and a deuterium atom ($_1{}^2$H or $_1{}^2$D, referred to herein as "D"). The oxygen atom may be any of the naturally occurring isotopes of oxygen ($^{16}$O, $^{17}$O or $^{18}$O), or mixtures thereof at any proportion. As used herein, n(OD) means the total number of OD moieties in a material. The ratio of n(OH)/(n(OD)+n(OH)) in the material is equal to or higher than the natural isotopic abundance of deuterium (or OD).

Referring to the drawings in general and to FIG. 1 in particular, it will be understood that the illustrations are for the purpose of describing a particular embodiment of the invention and are not intended to limit the invention thereto.

Optics used in the semiconductor area, particularly those related to the projection optics train, have very strict requirements for both dynamic properties and static properties. Such dynamic properties include light induced wavefront distortion (LIWFD) and polarization induced birefringence (PIB). The light sources that are typically used in these systems are lamps or lasers. The lasers used are KrF (248 nm emission wavelength), ArF (193 nm emission wavelength), and $F_2$ (157 nm emission wavelength). Lamps that are used include deuterium ($D_2$) and xenon lamps, both of which have emission wavelengths of less than 200 nm. Lasers are the most commonly used light source. Therefore, LIWFD is sometimes called laser induced wavefront distortion. Static properties include, for example, homogeneity, birefringence, and transmission. The next generation of optics will require improved LIWFD, PIB, index homogeneity, and lower OH and OD levels than those presently available in fused silica.

As a result of having low levels of additives—specifically, OH, OD, chlorine, bromine, and fluorine—it is possible to obtain highly homogeneous fused silica glass. These components affect the index of refraction of fused silica in two ways. First, there is the compositional impact of the material itself on the index of refraction. Secondly, these components, especially at low levels, affect the structure and mobility of the glass. The latter behavior is illustrated for OH in FIG. 1, which is a plot of the change in OH concentration per 1 ppm change in refractive index as a function of OH concentration. Turning to FIG. 1, the change in refractive index is relatively constant at OH concentrations greater than about 400 ppm. Below 400 ppm the change in refractive index decreases sharply with increasing OH concentration. While FIG. 1 only shows the dependence of refractive index on OH concentration, OD, chlorine, bromine, and fluorine will each have similar structural as well as compositional impact. The actual impact will be unique to each of the above additives.

A fused silica glass and an article formed from the fused silica glass are provided. The fused silica glass comprises at least one of OH and OD. The total or combined concentration of OH and OD is less than about 50 ppm. In one embodiment, the combined concentration of OH and OD is in a range from about 50 ppm to about 0.1 ppm. As used herein, "total concentration" and "combined concentration" mean the sum of the concentrations of OD (n(OD)) and OH (n(OH))— i.e., combined concentration=n(OD)+N(OH). The deuteroxyl species is present in an amount that is greater than or equal to the natural isotopic abundance of deuterium; i.e., the ratio of n(OH)/(n(OD)+n(OH)) in the material is greater than or equal to $2\times10^{-4}$. In another embodiment, the fused silica glass has a combined concentration OD and OH of less than about 20 ppm. In a third embodiment, the combined concentration of OH and OD in the fused silica glass is less than about 10 ppm.

In one embodiment, at least one of OH and OD is intentionally added to the fused silica glass. In another embodiment, the fused silica glass is substantially free of OH and comprises less than about 50 ppm of OD. As used herein, "substantially free of OH" means that OH is not intentionally added to the fused silica during any of the processing steps leading to the formation of the fused silica glass. It is understood that a fused silica glass or a fused silica article that is substantially free of OH may inadvertently contain small amounts of OH due to exposure to water or hydrogen ($H_2$) vapor during processing.

In one embodiment, the fused silica glass further includes at least one of the species $H_2$, $D_2$, and HD. These species may be present in a combined concentration in a range from about $5\times10^{15}$ molecules/cm$^3$ to about $5\times10^{19}$ molecules/cm$^3$ (i.e., $5\times10^{15}$ molecules/cm$^3 \geq [n(H_2)+n(D_2)+n(HD)] \geq 5\times10^{19}$ molecules/cm$^3$].

Figure 2:
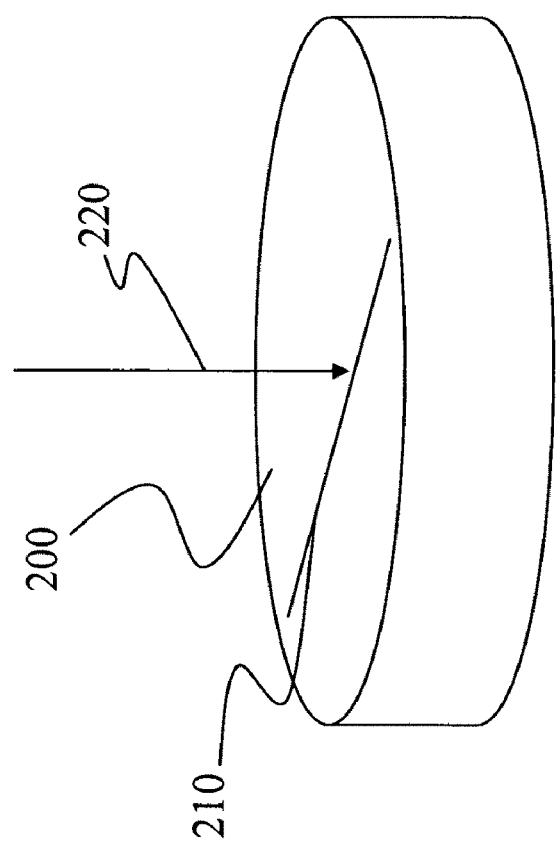
FIG. 2 is a schematic representation of a fused silica blank.

The fused silica glass has a refractive index variation at a wavelength of 633 nm that is less than about 5 ppm when the combined concentration of OD and OH has a variation of less than about 25 ppm. As used herein, the term "variation of less than about 25 ppm" means the difference between the maximum combined concentration and minimum combined concentration of OH and OD is less than about 25 ppm: [(n(OH)+n(OD))$_{max}$−(n(OH)+n(OD)$_{min}$]<25 ppm. In one embodiment, the fused silica glass has a refractive index variation at a wavelength of 633 nm that is less than about 5 ppm in a direction in which the OD concentration has a variation of less than about 25 ppm. As used herein, the term "variation of less than about 25 ppm" means the difference between the maximum combined concentration and minimum combined concentration of OD is less than about 25 ppm: [n(OD)$_{max}$−n(OD)$_{min}$]<25 ppm. The refractive index variation is also less than about 5 ppm over a distance of at least about 50 mm along a dimension of the sample perpendicular to incident light. In one embodiment, the fused silica article has a refractive index variation at a wavelength of 633 nm of less than about 5 ppm over a distance of at least about 100 mm along the dimension of the sample perpendicular to incident light. In another embodiment, the fused silica article has a refractive index variation at a wavelength of 633 nm of less than about 5 ppm over a distance of at least about 200 mm along a dimension of the sample perpendicular to incident light. FIG. 2 is a schematic representation of a fused silica article 200 in which the dimension 210 in which the variation of refractive index is perpendicular to incident light 220 is shown. As used herein, the terms "variation of refractive index," "refractive index variation," and "Δn" refer to the maximum variation of refractive indices in a plane perpendicular to the optical axis of the fused silica material or fused silica optical member along a predetermined direction. The refractive index variation is measured using interferometry at about 633 nm (He—Ne laser) with tilt and piston being subtracted out. Therefore, the refractive index variation, as described herein, along a certain direction such as, for example, the radial direction in a sample prepared by using the outside vapor deposition (OVD) process, does not include tilt or piston.

Figure 3:
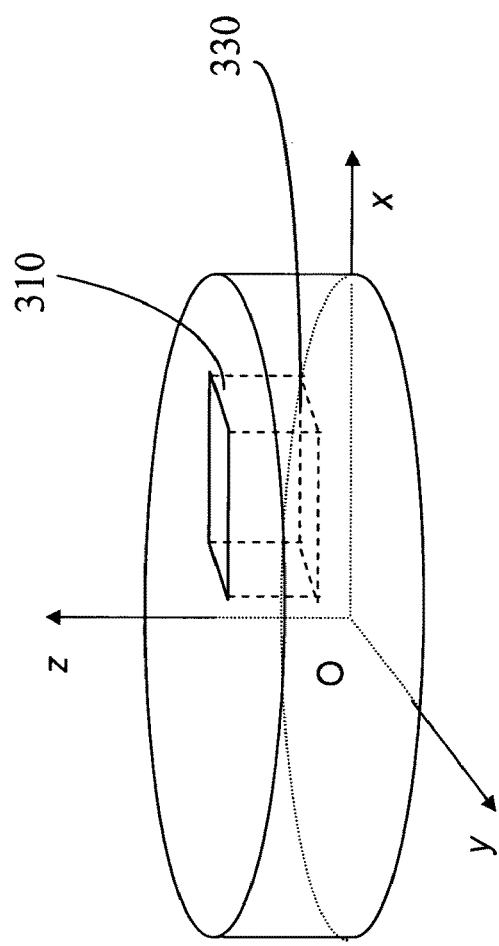
FIG. 3 is a schematic representation of a fused silica article showing the dimension in which the variation of refractive index is perpendicular to incident light.

A fused silica blank in a xyz orthogonal coordinate system is schematically shown in FIG. 3. A sampling of blank 310 has an optical axis z. The plane xOy, perpendicular to axis z, intersects a sampling of blank 310 to obtain a cross-section of the blank. When measuring refractive index homogeneity, the sample taken (for example, sample 330 indicated in FIG. 3) has a uniform thickness. When measured across the cross-section, the variation of refractive index in the desired direction (such as the radial direction of a sample prepared using outside vapor deposition (OVD), or the x direction as illustrated in FIG. 3), with tilt and piston subtracted out, is less than 5 ppm. In another embodiment, the refractive index variation, with tilt and piston removed, is less than 2 ppm and, in still another embodiment, less than 1 ppm. Index homogeneity can be measured using interferometry instruments, such as those manufactured by ZYGO™ Corp. of Middlefield Conn.

Figure 4:
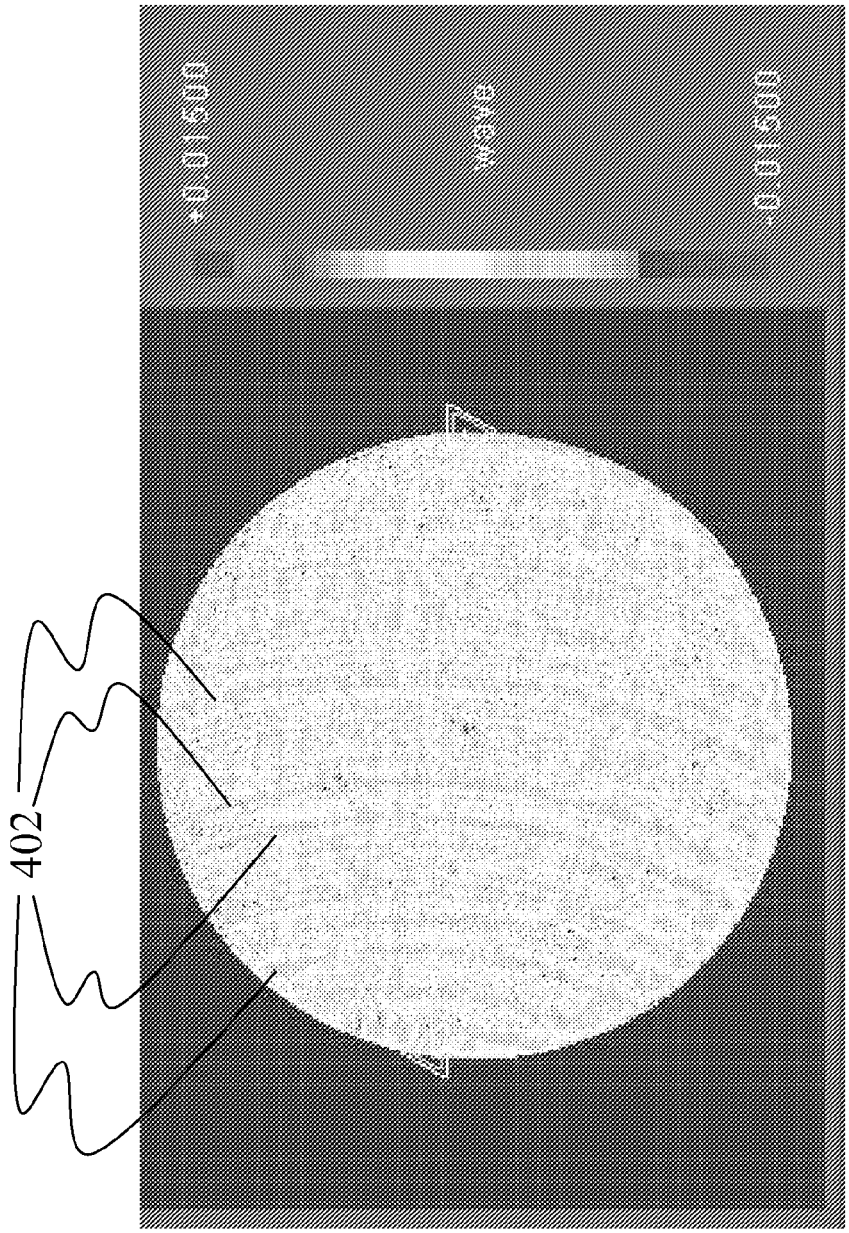
FIG. 4 is an interferometer image of regularly occurring radial striae in fused silica glass of the prior art.
Figure 5:
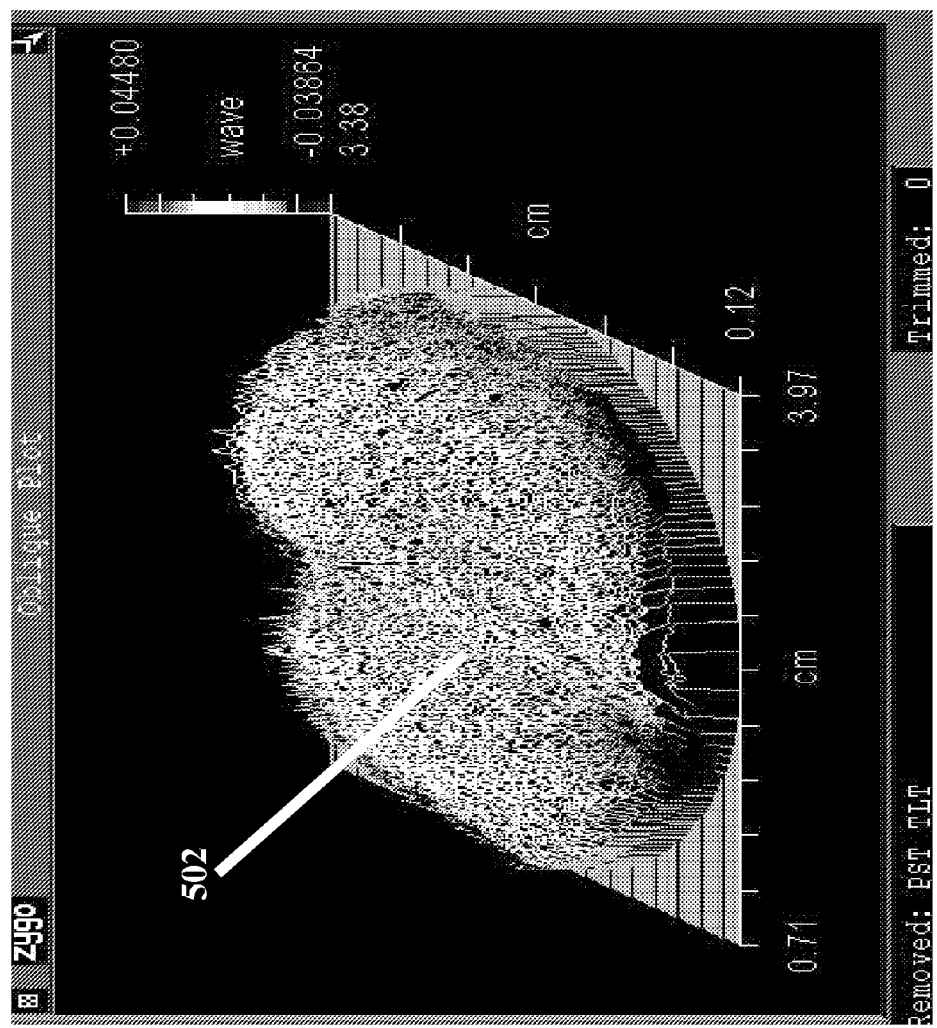
FIG. 5 is an interferometer image of an event stria in fused silica of the prior art.

It is common for the fused silica formed by a soot generation process to contain inhomogeneities such as multiple striae and event striae, the latter of which includes radial inflections or discontinuities. As used herein, the term "striae" refers to periodic occurrences or inhomogeneities such as, for example, fluctuations in refractive index. The periodicity of such occurrences ranges up to about 5 mm in distance. As used herein, the term "event striae" refers to a single or multiple events or occurrences that are non-repetitive or random on a scale of at least 1 mm. Such occurrences include changes in refractive index that occur over a range of 0.5 mm or more and have an amplitude of at least 0.01 ppm. An example of a prior art fused silica glass having multiple, regularly occurring striae 402 is shown in FIG. 4, which is an interferometer image obtained using 633 nm light with a high bypass filter. Regularly occurring striae 402 are seen over the 32 mm diameter region shown in FIG. 4. FIG. 5, which is an interferometer image obtained using 633 nm light with only piston and tilt removed, shows event stria 502 in prior art glass. FIGS. 4 and 5 are plots of refractive index variation as a function of position.

Figure 6:
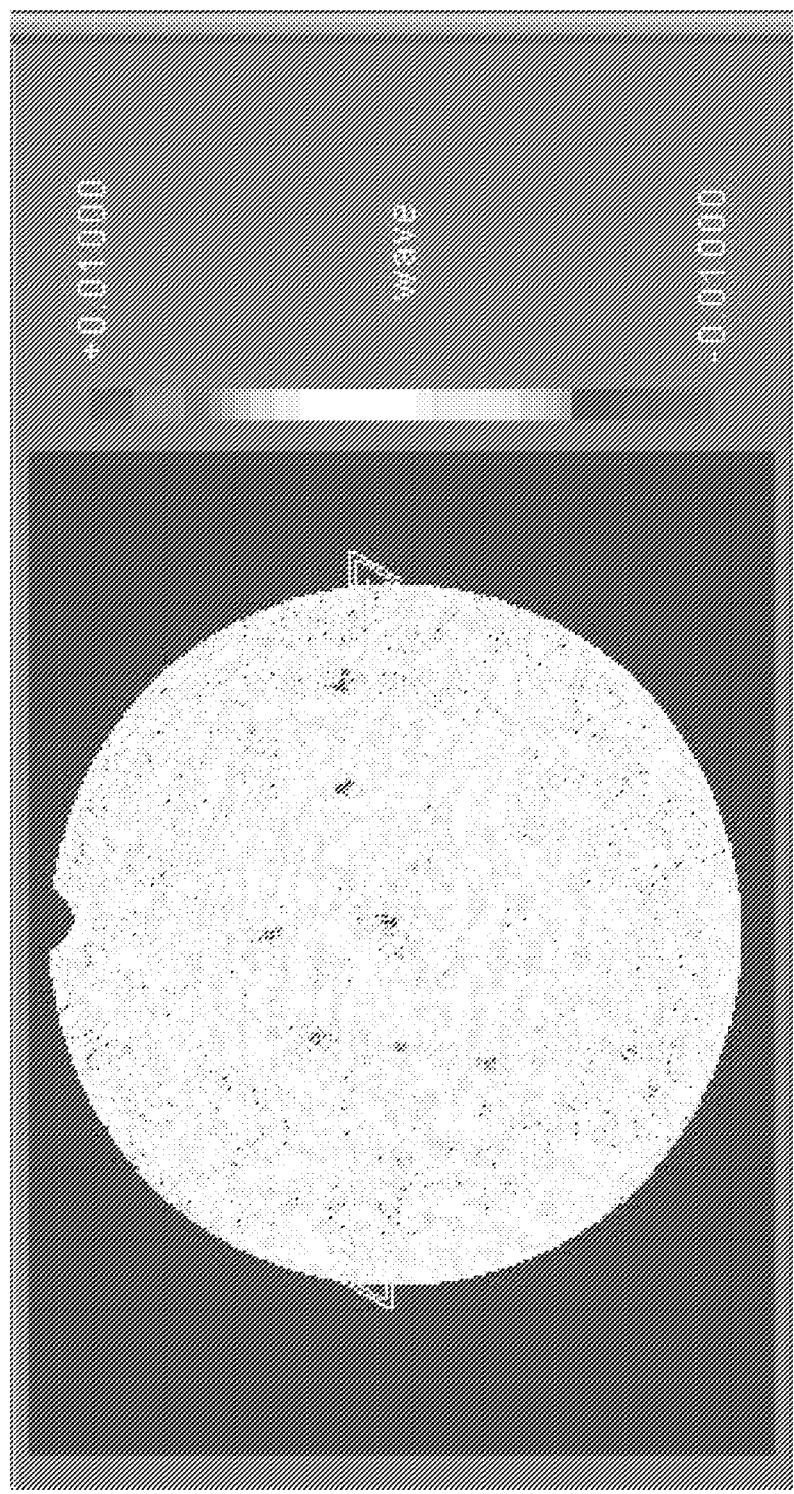
FIG. 6 is an interferometer image of the fused silica glass of the present invention.
Figure 7:
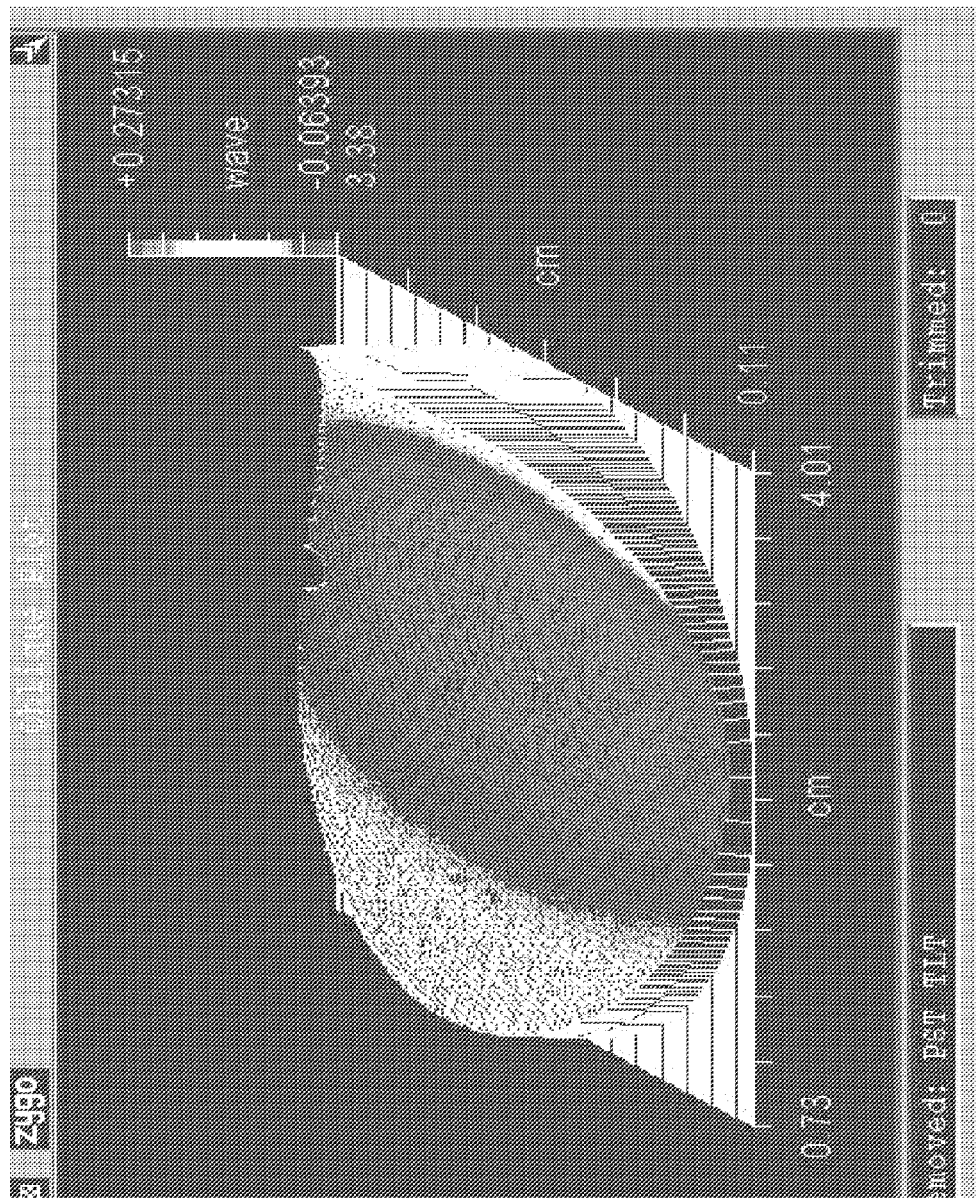
FIG. 7 is a interferometer image of the fused silica glass of the present invention in which piston and tilt have been removed.

The fused silica glass of the present invention is, however, substantially free of radial striae. FIGS. 6 and 7 are interferometer images of fused silica of the present invention obtained using 633 nm light, and represent plots of refractive index variation as a function of position for a fused silica glass sample of the present invention. FIG. 6, which was obtained using the same high bypass filter as that used in FIG. 4, shows that, compared to the sample shown in FIG. 4, the fused silica sample of the present invention has no evident striae and thus exhibits improved homogeneity. FIG. 7, in which only piston and tilt were removed (as in FIG. 5), shows a fused silica glass sample of the present invention in which event striae are absent.

Light induced wavefront distortion describes the wavefront distortion behavior of material such as silica due to prolonged exposure to irradiation by certain wavelengths of light, such as those generated by excimer lasers in the deep UV and vacuum UV ranges. In one embodiment, the fused silica glass exhibits a laser induced wavefront distortion, measured at 633 nm, of between −1.0 and 1.0 nm/cm, when subjected to 10 billion pulses of a laser beam operating at approximately 193 nm, wherein the laser beam has a fluence of approximately 70 µJ·cm$^{-2}$·pulse$^{-1}$ and a pulse length of approximately 25 ns.

Polarization induced birefringence refers to the numerical difference between the peak measured birefringence level in the center portion of the uniformly exposed area of the fused silica glass after a certain time interval or laser pulses (if a pulsed laser beam is used) and the initial birefringence of the glass before exposure to radiation. The PIB level of a fused silica sample may be measured by directing a linearly polarized pulsed laser beam having a wavelength of approximately 193 nm and a beam diameter of about 3 mm with a given fluence and pulse length to a fixed area of the fused silica sample. The measured birefringence at the center portion of the exposed area is measured after a certain number of pulses. The PIB value is then calculated by subtracting the initial birefringence of the glass from the measured center birefringence.

In one embodiment, the fused silica glass exhibits less than about 1 nm/cm of polarization-induced birefringence measured at about 633 nm after being subjected to $5\times10^9$ pulses of a linearly polarized pulsed laser beam at about 193 nm, wherein the laser beam has a fluence of about 40 µJ·cm$^{-2}$·pulse$^{-1}$ and a pulse length of about 25 ns. In a second embodiment, the fused silica glass exhibits less than about 0.1 nm/cm of polarization-induced birefringence measured at about 633 nm after being subjected to $1\times10^{10}$ pulses of a linearly polarized pulsed laser beam at about 193 nm, wherein the laser beam has a fluence of about 40 µJ·cm$^{-2}$ pulse$^{-1}$ and a pulse length of about 25 ns. In a third embodiment, the fused silica glass exhibits less than about 0.1 nm/cm of polarization-induced birefringence measured at about 633 nm after being subjected to $2 \times 10^{10}$ pulses of a linearly polarized pulsed laser beam at about 193 nm, wherein the laser beam has a fluence of about 40 $\mu$J·cm$^{-2}$ pulse$^{-1}$ and a pulse length of about 25 ns. In a fourth embodiment, the fused silica glass exhibits less than about 0.04 nm/cm of polarization-induced birefringence measured at about 633 nm after being subjected to $2 \times 10^{10}$ pulses of a linearly polarized pulsed laser beam at about 193 nm, wherein the laser beam has fluence of about 40 $\mu$J·cm$^{-2}$ pulse$^{-1}$ and a pulse length of about 25 ns.

The invention also provides a fused silica article formed from the fused silica glass described hereinabove. The fused silica article may, in one embodiment, be an optical element, such as those included in an optical path within lithographic stepper/scanner systems.

To be capable of use within an optical path of a lithographic stepper/scanner system, a fused silica glass—or an optical element formed therefrom—should have low levels of contaminants. Certain metal ions, such as alkaline metal ions, alkaline earth metal ions, and transition metals are detrimental to the optical performance of the fused silica glass at deep UV and vacuum UV wavelengths. Such detrimental effects are manifested in terms of initial transmission, induced absorption, PIB, LIWFD, FDT, and the like. In addition to low levels of OH, OD, Cl, and F, it is therefore desirable that the fused silica glass and fused silica articles described herein that are used in the refractive elements of lithographic devices operating in the deep UV and/or vacuum UV have a low levels of undesirable contaminants such as Li, Na, K, Rb, Be, Mg, Ca, Sr, Ba, Group 14 metals (Ge, Sn, Pb), Group 15 metals (As, Sb, Bi), transition metals, and the like. In particular, the silica glass of the present invention has a Na concentration of below about 50 ppb by weight; in another embodiment, below about 20 ppb; in certain embodiments, below about 10 ppb, in other embodiments below about 5 ppb; and in certain other embodiments below about 1 ppb.

If the silica glass of the present invention comprises at least one metal M other than Na, for each and every metal M, the concentration of M ([M]) is desirably below about 100 ppb by weight, in certain embodiments [M]≦10 ppb and, in certain embodiments, [M]<1 ppb. If the silica glass of the present invention comprises at least one metal M other than Na, it is, in certain embodiments, desired that for all metals M, $\Sigma$[M] ≦200 ppb by weight, in certain embodiments $\Sigma$[M]≦100 ppb, and, in certain embodiments $\Sigma$[M]≦50 ppb. If the silica glass of the present invention comprises Na and at least one other metal M, it is desired in certain embodiments that for all metals, $\Sigma$([Na]+[M])≦200 ppb by weight, in other certain embodiments $\Sigma$([Na]+[M])≦100 ppb, and, in other embodiments $\Sigma$([Na]+[M])≦50 ppb.

A method of making the fused silica glass described herein is also provided. In the first step, a fused silica soot blank—or preform—is provided. The soot blank is formed, for example, by a deposition method in which a gas stream containing a silicon-containing compound in vapor form is produced. The gas stream containing the silicon-containing compound is passed into the flame of a combustion burner to form amorphous particles of fused silica soot. The fused silica particles are deposited onto a support to form the fused silica soot blank. The support may be a supporting core cane or a mandrel, such as those in a typical outside vapor deposition (OVD), planar soot deposition (PSD), or a vapor axial deposition (VAD) process. If a mandrel is used, the mandrel may be removed after deposition to yield a hollow, cylindrically-shaped porous soot body.

The soot particles are typically provided by flame hydrolysis of at least one silicon precursor compound. Silicon precursor compounds include, but are not limited to, halogen-containing compounds such as $SiCl_4$, $SiBr_4$, $SiF_4$, and the like. Silicon precursor compounds also include, but are not limited to, halide-free cyclosiloxane compounds such as, for example, polymethylsiloxanes. Such polymethylsiloxanes include hexamethyldisiloxane, polymethylcyclosiloxane, octamethylcyclotetrasiloxane (OMCTS), decamethylcyclopentasiloxane, hexamethylcyclotrisiloxane, silicon halides, and combinations thereof. The silicon precursor compounds may comprise D at a level higher than its natural isotopic abundance (such as, for example, D-containing OMCTS), in which case the soot particles are usually doped with OD when originally produced. Alternatively, silicon precursor compounds comprising D at a level no more than its natural isotopic abundance may undergo flame reactions in an atmosphere comprising D at a level higher than its natural isotopic abundance. Such an atmosphere may include either $D_2O$ added to the atmosphere or $D_2O$ produced from burning deuterium-containing fuels, such as $CD_4$, $CDH_3$, $CD_2H_2$, $D_2$, HD, and the like. In another embodiment, deuterium may be added to the soot or fused silica as $D_2$ during a hydrogen loading process, such as that described in U.S. patent application Ser. No. 11/348,956, entitled "Deuteroxyl-Doped Silica Glass, Optical Member and Lithographic System Comprising Same and Method of Making Same," by Dana Craig Bookbinder et al., filed Feb. 6, 2006, the contents of which are incorporated by reference herein in their entirety. In one embodiment, hydrogen and/or deuterium loading is carried out at temperatures up to about 800° C., whereas in another embodiment, such loading is carried out at a temperatures of up to about 500° C., and, in yet another embodiment, loading is carried out at temperatures less than about 200° C. In some instances, OD is formed during $D_2$ loading. In particular, such OD formation occurs when the fused silica soot is sintered in an oxygen-containing atmosphere. For example, fused silica soot that is sintered in a helium atmosphere containing 10% $O_2$ and then loaded with $D_2$ at 475° C. forms fused silica glass containing about 1-5 ppm OD, due to reaction of $D_2$ with excess oxygen in the glass.

In one embodiment, the soot blank has a density in a range from about 0.3 up to about 1.4 g/cm$^3$. In another embodiment, the soot blank may weigh up to about 100 kg.

To ensure the effectiveness of OH and/or OD, the fused silica soot blank may be optionally pre-treated by heating the soot blank in a furnace at temperatures between 800° C. and 1275° C. under an inert gas atmosphere. The inert gas may comprise helium, nitrogen, argon, or combinations thereof, with helium gas being preferred. The inert gas atmosphere may contain up to 30% oxygen by volume. Unless otherwise stated, concentrations in the gas mixtures described herein are expressed in volume percent. The pressure of the inert gas atmosphere is between 0 and 5 atmospheres and, preferably, about 1 atmosphere. The soot perform is held at temperature under the inert gas for anywhere from 0 to 20 days in order to reach thermal equilibrium. In one particular embodiment, the soot perform is held at temperature for 2 to 4 hours to reach thermal equilibrium.

The soot blank has an initial concentration of at least one of OH and OD. The soot blank is next dried in an inert gas atmosphere that comprises a predetermined concentration of at least one drying agent such as, but not limited to, halogen-containing species such as, but not limited to, $Cl_2$, $Br_2$, $F_2$, $CF_4$, $SiF_4$, $C_2F_6$, and the like. Other drying agents include CO, $CO_2$, combinations thereof, and the like. The inert gas may comprise helium, nitrogen, argon, combinations thereof, and the like. In addition, the atmosphere may, at some point in the drying process, further include oxygen to ensure that no reduced silica is present in the soot blank.

The drying agent (or agents) reduces the OH and/or OD concentration in the soot blank to less than about 10 ppm. In one embodiment, the OH and/or OD levels are reduced to less than 1 ppm.

The concentration of the drying agent—particularly in the case of halogen-containing drying agents—is kept low to minimize reaction with the soot blank and the resultant retention of at least one of chlorine, bromine, and fluorine in the glass. The concentration of the drying agent in the inert gas atmosphere is in a range from about 0.01% up to about 10% by volume. In one embodiment, the drying agent concentration in the inert gas atmosphere is in a range from about 0.1% up to about 3%.

The drying step is carried out at a predetermined temperature. In one embodiment, the temperature is in a range from about 850° C. up to about 1300° C. In one particular embodiment, the drying step is carried out at 1260° C.

In the next step, residual drying agent is removed from the dried soot blank. In one embodiment, residual drying agent is removed by heating the dried soot blank in an atmosphere comprising an inert gas such as helium, nitrogen, argon, or the like, and a predetermined concentration of oxygen at a second predetermined temperature. The oxygen concentration is in a range from about 3% up to about 30% by volume. Higher oxygen concentrations may lead to entrapment of oxygen gas (also known as "seeds") in the final glass product. The second predetermined temperature is in a range from about 850° C. up to about 1300° C. In one particular embodiment, the second predetermined temperature is in a range from about 1200° up to about 1300° C. In the next step, the fused silica soot blank is formed into seed-free glass by sintering the soot blank in a helium atmosphere comprising 10% $O_2$ at a temperature in a range from about 1350° C. to about 1450° C. In one embodiment, the method may further include loading the fused silica glass with at least one of $H_2$, $D_2$, and HD. Such loading is described in U.S. patent application Ser. No. 11/348,956, entitled "Deuteroxyl-Doped Silica Glass, Optical Member and Lithographic System Comprising Same and Method of Making Same," by Dana Craig Bookbinder et al., previously referenced herein. The species $H_2$, $D_2$, and HD are present in a combined concentration in a range from about $5 \times 10^{15}$ molecules/cm$^3$ to about $5 \times 10^{19}$ molecules/cm$^3$.

In order to avoid or minimize the presence of OH and OD in the fused silica—and thus minimize formation of SiOH species—during the step of reducing the amount of drying agent in the glass, the level of water or $D_2O$ must be maintained at less than 200 ppm in the furnace is which the drying agent removal takes place. On one embodiment, the water or $D_2O$ level is maintained below 100 ppm. In another embodiment, the water or $D_2O$ level is maintained below 500 ppm. Leaks in the furnace can result in ingress of moisture from the ambient air. In one embodiment, chlorine removal is carried out by heating the soot blank while maintaining the furnace at a pressure greater than ambient pressure. The positive pressure difference minimizes exposure of the soot blank to water vapor.

A fused silica article formed using the method described hereinabove is also provided. The fused silica article may, in one embodiment, be an optical element, such as those included in lithographic stepper/scanner systems.

The following examples illustrate the various features and advantages of the invention, and are in no way intended to limit the invention thereto.

Example 1

Figure 8:
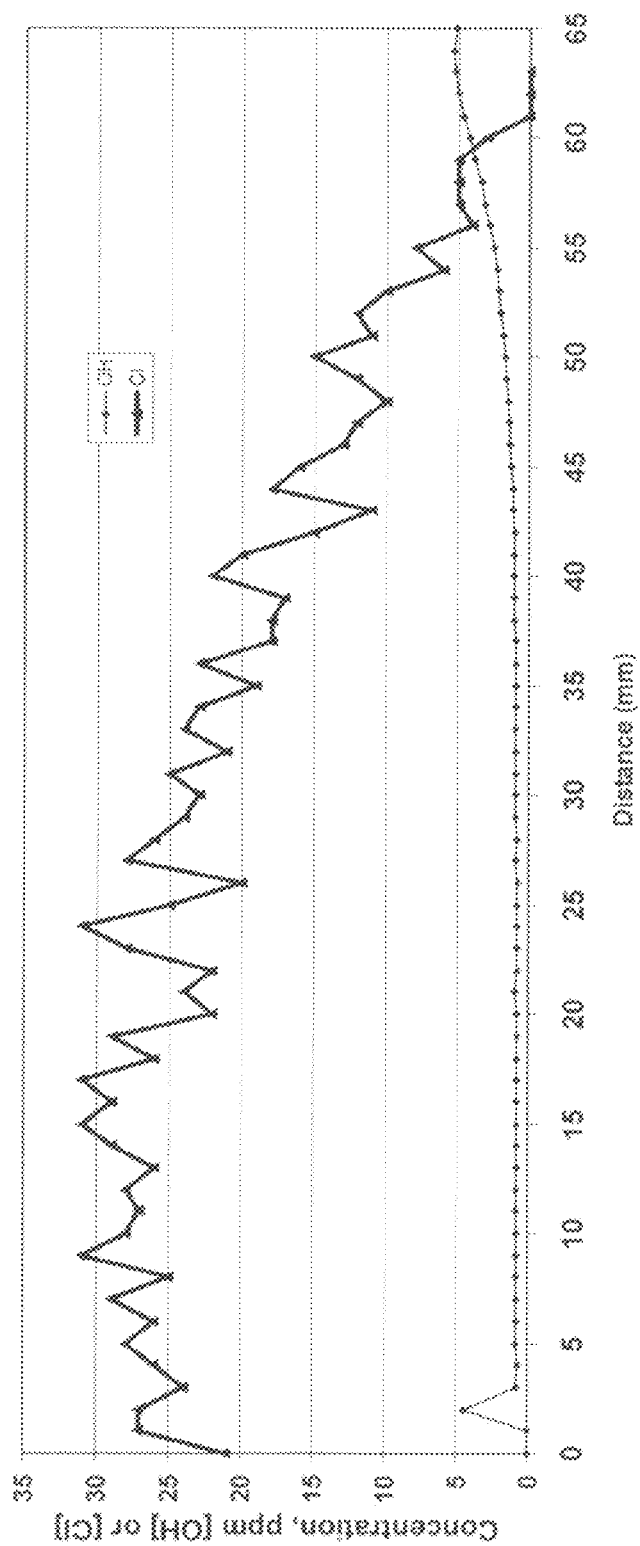
FIG. 8 is a plot chlorine and OH distributions in the fused silica glass described in Example 1.

The following process was used to make fused silica glass having low OH and chlorine content. A soot preform, having a mass of about 47 kg and a bulk density of about 0.5 g/cm$^3$, was made using octamethylcyclotetrasiloxane (OMCTS) and loaded into a consolidation furnace. The soot preform was then dried in a helium atmosphere having a 0.4% concentration of $Cl_2$ by volume for 4 hours at 1260° C. The $Cl_2$ flow to the furnace was then shut off. Residual $Cl_2$ in the soot preform was then removed by adding a 10% Oxygen concentration by volume to the helium atmosphere at 1260° C. for an additional 13 hours. The preform was then fully consolidated in the same atmosphere of 10% oxygen in helium by ramping the furnace up to about 1400° C. over the next 17 hours. Chlorine and OH concentration were measured by electron microprobe and FTIR characterization techniques, respectively. The chlorine and OH distributions for this fused silica glass are plotted in FIG. 8. The results indicate that OH levels had been reduced to less than 6 ppm by weight in the entire glass article and that the Cl concentration had been reduced to less than 35 ppm by weight in the entire glass article. The glass had no striae (FIG. 6) and no event striae (FIG. 7).

The following three examples are comparative examples for Example 1.

Comparative Example 1

Figure 9:
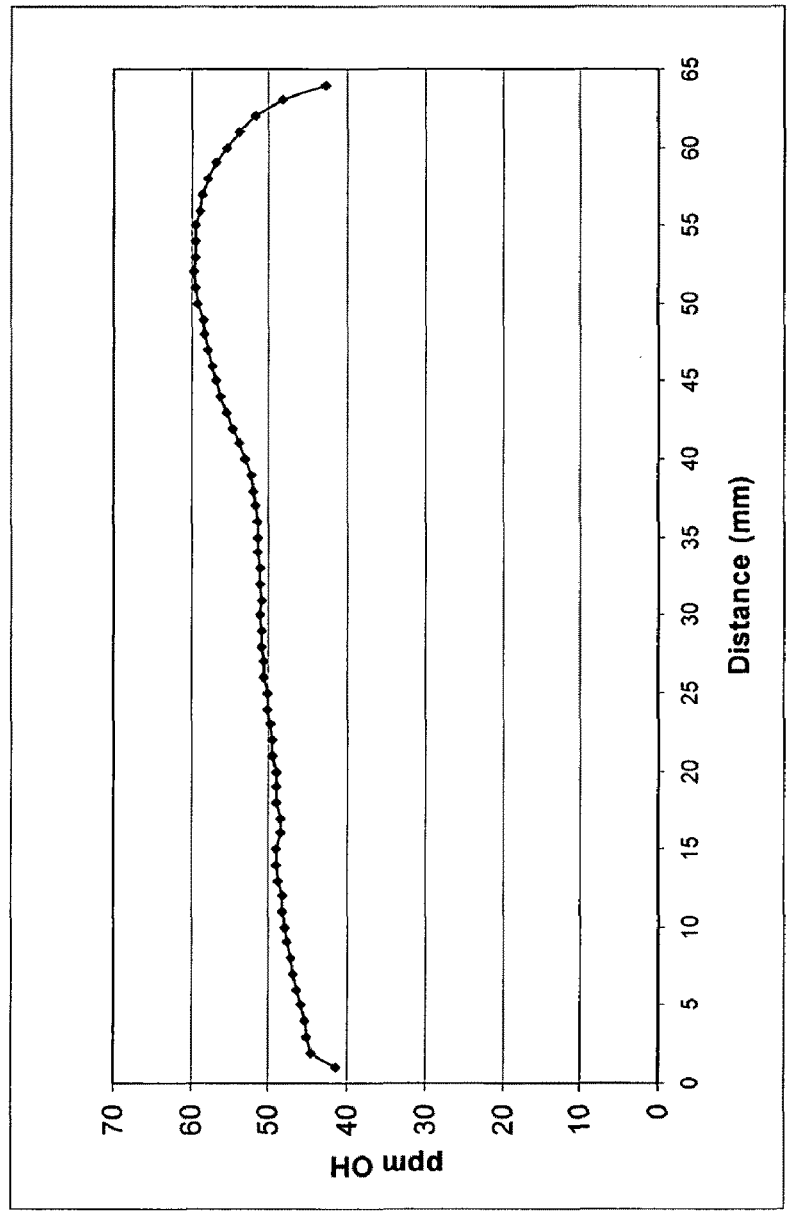
FIG. 9 is a plot of OH distribution for the fused silica glass described in Comparative Example 1 (prior art)

A fused silica glass was made using the following process. A fused silica soot preform made using OMCTS and having characteristics similar to those of the soot preform described in Example 1 was loaded into a consolidation furnace. The soot perform was then held in a helium atmosphere with an oxygen concentration in a range from 0.5% to 3.0% for 22.5 hours. The preform was then fully consolidated in an atmosphere comprising 0.5% oxygen and about 400 ppm water vapor in helium. The resulting glass contained 45-60 ppm OH with no Cl, F, or OD. The glass also contained striae and event striae. The resultant OH distribution for this glass is plotted in FIG. 9. The results indicate that the glass has higher levels of OH than that obtained in Example 1 of the present invention.

Comparative Example 2

Figure 10:
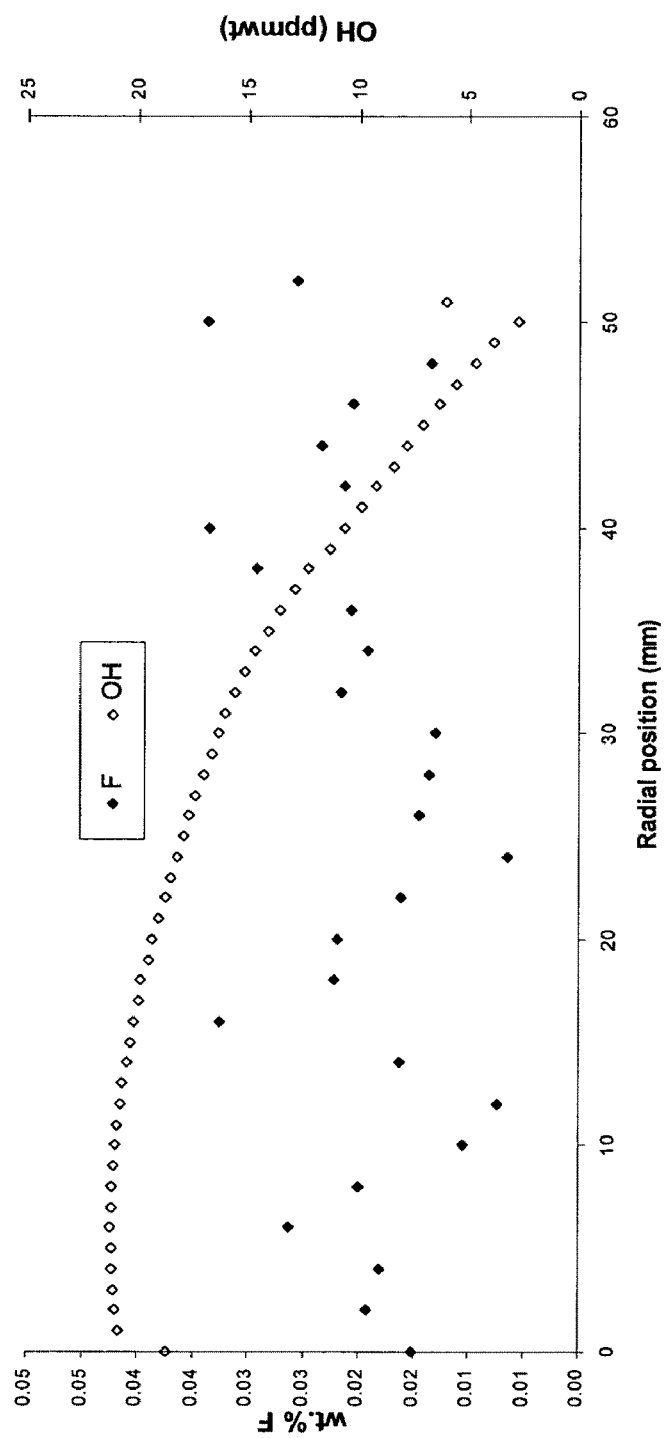
FIG. 10 is a plot of OH and F distribution for the fused silica glass described in Comparative Example 2.

A fused silica glass was made using the following process. A fused silica soot preform made using OMCTS and having characteristics similar to those of the soot preform described in Example 1 was loaded into a consolidation furnace. The soot preform was then held in a helium atmosphere with a 0.1% $CF_4$ concentration for 4 hours at 1000° C. The preform was then fully consolidated in a helium atmosphere with a 3.0% oxygen concentration. The resulting glass contained less than 25 ppm OH, no Cl, no OD, and less than about 500 ppm F. The resultant OH and fluorine distributions for this glass are shown in FIG. 10. The results indicate that fluorine and fluorine-containing compounds may be used as drying agents.

Example 2

This example demonstrates the use of oxygen for the removal of chlorine from the glass. A fused silica glass was made using a soot preform that was formed using OMCTS and having characteristics similar to those of the soot preform described in Example 1. The soot perform was loaded into a consolidation furnace and held in a helium atmosphere having a $Cl_2$ concentration of 0.4% for 4 hours at 1225° C. The preform was then fully consolidated in a helium atmosphere having an $O_2$ concentration of 3.0%, ramping up to 1450° C. from 1225° C. in nine hours. The resulting glass contained 0-6 ppm OH, no OD, no F and ~0-200 ppm Cl.

The following is a comparative example for Example 2.

Comparative Example 3

A glass was prepared from a soot perform made using OMCTS and having characteristics similar to those of the soot preform described in Example 1. The soot perform was loaded into a consolidation furnace and held in a helium atmosphere having a $Cl_2$ concentration of 0.4% for 4 hours at 1225° C. The preform was then fully consolidated in a helium atmosphere with no oxygen added, ramping up to 1450° C. from 1225° C. over nine hours. The resulting glass contained 0-6 ppm OH, no OD, no F, and ~0-500 ppm Cl. These results demonstrate that oxygen may be used to reduce the amount of chlorine in the glass without significantly changing the OH level in the glass. Other agents, such as water vapor and $D_2O$ vapor, may also be used to reduce chlorine, bromine, and fluorine levels.

Example 3

The following process was used to make fused silica glass having low OH and bromine content. A $SiO_2$ soot preform (1 meter length, 5000 g weight, bulk density of approximately of 0.5 g/cm$^3$) was formed onto a 12 mm silica mandrel using flame hydrolysis of $SiCl_4$. The preform was loaded into the upper portion of a down-drive consolidation furnace having an upper zone set at 1240° C. and a lower zone (sintering zone) set at 1550° C. The soot preform was then pre-heated at 1240° C. for 2 hours in a pure helium atmosphere and then dried at 1240° C. for 2 hours in a helium atmosphere containing bromine vapor (8 SLPM He and approximately 2.5 grams/minute $Br_2$). Residual bromine and bromine byproducts from the drying step were then removed from the dried soot preform by continuing to hold the preform at 1240° C. under 15 SLPM of pure helium for 2 hours, followed by a hold at 1240° C. for 1 hour in 15 SLPM He plus 5 SLPM oxygen (He containing 25% oxygen). The dried soot preform was then sintered to a seed-free clear glass in an atmosphere of helium containing 25% oxygen by volume to ensure removal of bromine from the soot preform by down-driving the soot preform at 5 mm/minute through a hot-zone set at 1550° C.

Bromine and chlorine concentrations in the sintered glass were measured by electron microprobe and silver titration. The chlorine concentration was below the 5 ppm detection limit, whereas bromine was below the 20 ppm detection limit of both techniques.

Figure 11:
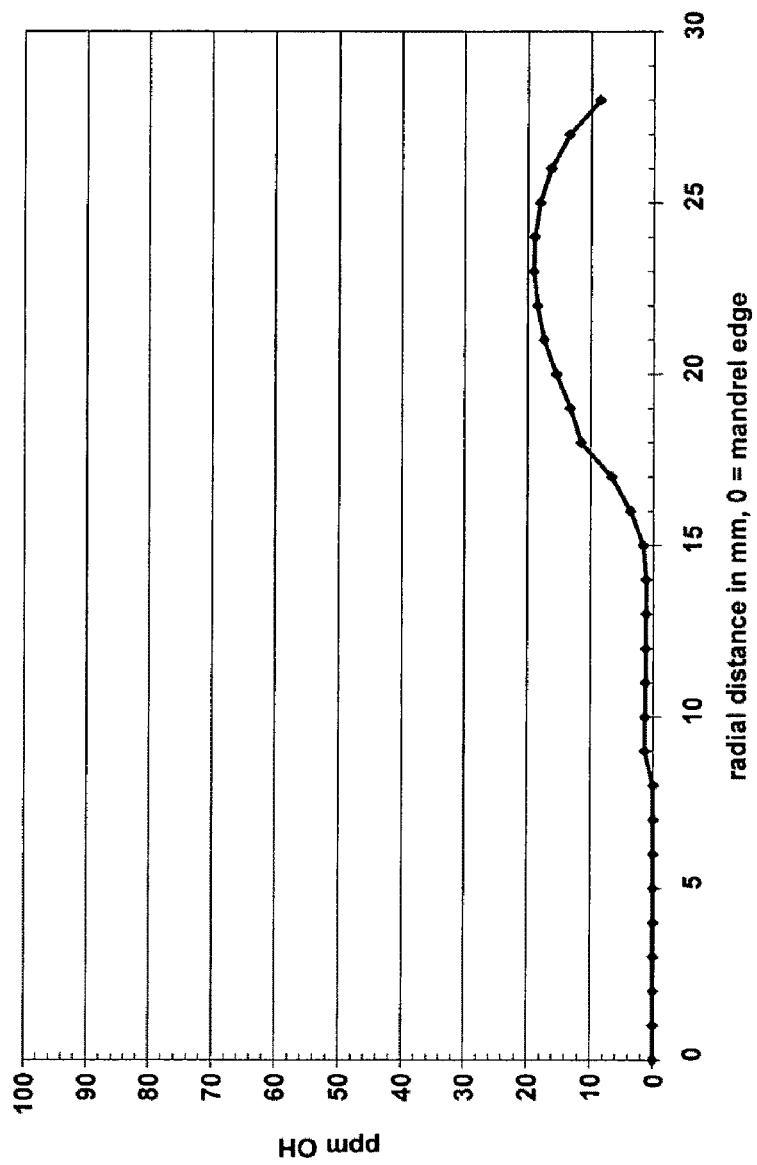
FIG. 11 is a plot of OH distribution for the fused silica described in Example 3.

The OH concentration was measured by FTIR characterization techniques. The OH distribution for this fused silica glass is plotted as a function of radial position from the edge of the mandrel in FIG. 11. The results indicate that OH levels had been reduced to less than 20 ppm by weight in the entire glass article and that there was no detectable Cl or Br (<5 and <20 ppm, respectively). It is believed that the small amount of OH in this sample is a result of re-wetting after the drying step. This re-wetting could have been caused by small amounts of water in the He/oxygen atmosphere. Such re-wetting could be reduced by using drier gases (i.e., gases having lower residual water content) or longer purging after the drying step in an atmosphere containing only He to remove the bromine drying products (e.g., HBr) prior to exposure of the soot to oxygen. The latter prevents possible back reactions of HBr with oxygen to form SiOH and $Br_2$. The OH concentration may also be reduced by first exposing the soot preform in the pre-heating step the consolidation furnace to $D_2O$, for example, in order to make a SiOD containing soot blank. The final sintered preform would then have <1 ppm OH, <20 ppm OD, and no Cl or Br (i.e., concentrations below the 5 ppm Cl and 20 ppm Br detection limits). In addition, either of the glasses described in this example could be exposed to a $D_2$ containing atmosphere at temperatures between about 200° C. and about 800° C., or, preferably, between about 400° C. and 500° C., to produce a glass having an OD concentration between 1 ppm and 20 ppm, OH<1 ppm, and no Cl, F, or Br.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A fused silica article, the fused silica article comprising OD and, optionally, OH, wherein OH and OD are present in a combined concentration of up to about 50 ppm, wherein the ratio of OD concentration to the sum of OD concentration and OH concentration is greater than the natural isotopic abundance of deuterium, wherein the fused silica article is free of straie, and wherein the fused silica article has a refractive index variation at a wavelength of 633 nm of less than about 5 ppm:
   i. in a direction in which the OH concentration and OD concentration have a combined variation of less than 25 ppm; and
   ii. over a distance of at least about 50 mm along a dimension of the sample perpendicular to incident light.

2. The fused silica article according to claim 1, wherein the fused silica article is substantially free of OH and comprises up to about 50 ppm of OD.

3. The fused silica article according to claim 1, wherein OH and OD are present in a combined concentration of up to about 20 ppm.

4. The fused silica article according to claim 1, wherein OH and OD are present in a combined concentration of up to about 10 ppm.

5. The fused silica article according to claim 1, wherein the combined concentration of OH and OD is in a range from about 50 ppm to about 100 ppb.

6. The fused silica article according to claim 1, wherein the fused silica article has a refractive index variation at a wavelength of 633 nm of less than about 5 ppm over a distance of at least about 100 mm along a dimension of the sample perpendicular to incident light.

7. The fused silica article according to claim 6, wherein the fused silica article has a refractive index variation at a wavelength of 633 nm of less than about 5 ppm over a distance of at least about 200 mm along a dimension of the sample perpendicular to incident light.

8. The fused silica article according to claim 1, further comprising at least one of $H_2$, $D_2$, and HD, wherein $H_2$, $D_2$, and HD are present in a combined concentration in a range from about $5 \times 10^{15}$ molecules/cm$^3$ to about $5 \times 10^{19}$ molecules/cm$^3$.

9. The fused silica article according to claim 1, wherein the fused silica glass exhibits a laser induced wavefront distortion, measured at 633 nm, of between −1.0 nm/cm and 1.0 nm/cm, when subjected to 10 billion pulses of a laser beam operating at approximately 193 nm, having a fluence of approximately 70 $\mu J \cdot cm^{-2} \cdot pulse^{-1}$, and a pulse length of approximately 25 ns.

10. The fused silica article according to claim 1, wherein the fused silica article exhibits less than about 1 nm/cm of polarization-induced birefringence measured at about 633 nm after being subjected to $5 \times 10^9$ pulses of a linearly polarized pulsed laser beam at about 193 nm having a fluence of about 40 $\mu J \cdot cm^{-2} \cdot pulse^{-1}$ and a pulse length of about 25 ns.

11. A method of making a fused silica glass, the fused silica glass comprising OD and, optionally, OH, wherein OH and OD are present in a combined concentration of up to about 50 ppm, wherein the fused silica article is free of straie, and wherein the ratio of OD concentration to the sum of OD concentration and OH concentration is greater than the natural isotopic abundance of deuterium, the method comprising the steps of:
   a. providing a silica soot blank, the soot blank comprising OD and, optionally, OH;
   b. drying the soot blank to form a dried soot blank in an atmosphere comprising an inert gas and a predetermined concentration of at least one drying agent at a predetermined temperature, wherein the drying agent removes OH and OD from the soot blank;
   c. removing the at least one drying agent from the dried soot blank; and
   d. sintering the soot blank to form the fused silica glass comprising OD and, optionally, OH, wherein OH and OD are present in a combined concentration of up to about 50 ppm.

12. The method according to claim 11, wherein the drying agent is one of CO, $CO_2$, at least one halogen-containing species, and combinations thereof.

13. The method according to claim 11, wherein the predetermined temperature is in a range from about 850° C. to about 1300° C.

14. The method according to claim 11, wherein the step of removing residual drying agent from the dried soot blank comprises heating the dried soot blank in an atmosphere comprising an inert gas and a predetermined concentration of oxygen at a second predetermined temperature.

15. The method according to claim 11, wherein the soot blank is maintained at a pressure that is greater than ambient pressure.

16. The method according to claim 11, wherein the fused silica glass is substantially free of OH.

17. An article comprising fused silica glass, the fused silica comprising OD and, optionally, OH, wherein OH and OD are present in a combined concentration of up to about 50 ppm, wherein the ratio of OD concentration to the sum of OD concentration and OH concentration is greater than the natural isotopic abundance of deuterium, wherein the fused silica article is free of straie, and wherein the fused silica glass has a refractive index variation at a wavelength of 633 nm of less than about 5 ppm:
   i. in a direction in which the OH concentration and OD concentration have a combined variation of less than 25 ppm; and
   ii. over a distance of at least about 50 mm along a dimension of the sample perpendicular to incident light, wherein the fused silica article is formed by:
      a. providing a silica soot blank, the soot blank comprising OD and, optionally, OH;
      b. drying the soot blank to form a dried soot blank in an atmosphere comprising an inert gas and a predetermined concentration of at least one drying agent at a predetermined temperature, wherein the drying agent removes OH and OD from the soot blank;
      c. removing the at least one drying agent from the dried soot blank; and
      d. sintering the soot blank to form the fused silica glass.

18. The article according to claim 17, wherein the fused silica optical member is substantially free of OH and comprises up to about 50 ppm of OD.

19. The article according to claim 17, further comprising at least one of $H_2$, $D_2$, and HD, wherein $H_2$, $D_2$, and HD are present in a combined concentration in a range from about $5 \times 10^{15}$ molecules/cm$^3$ to about $5 \times 10^{19}$ molecules/cm$^3$.

* * * * *